UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ACYL DERIVATIVE OF PARA-AMINOPHENYLARSINIC ACID.

No. 907,016.      Specification of Letters Patent.      Patented Dec. 15, 1908.

Application filed October 3, 1907. Serial No. 395,673.

*To all whom it may concern:*

Be it known that we, PAUL EHRLICH, M. D., LL. D., Chicago, professor of medicine, and ALFRED BERTHEIM, Ph. D., both citizens of the Empire of Germany, and residing at Frankfort-on-the-Main, Germany, have invented certain new and useful Improvements in Acyl Derivatives of Para-Aminophenylarsinic Acid, of which the following is a specification.

We have found that acid radicals may be introduced into para-aminophenlyarsinic acid by boiling the latter with acids. The reaction involved may, for instance, be illustrated by the following equation:

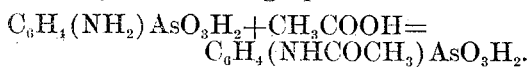

The resulting acid derivatives of para-aminophenylarsinic acid are valuable as medicaments against trypanosomatous infections and are less toxical than the sodium salt of para-aminophenylarsinic acid known as atoxyl. They are white crystalline bodies, soluble with difficulty in water, alcohol and ether, readily soluble in alkali or alkali-carbonates with formation of salts, precipitated from alkali salt solutions by hydrochloric acid and decomposed when boiled with concentrated hydrochloric acid forming para-aminophenylarsinic acid.

Example: 46 grs. of the dry sodium salt of para-aminophenylarsinic acid are boiled with 150 ccm. of glacial acetic acid with return flow until a test with a solution of para-dimethylamidobenzaldehyde in dilute hydrochloric acid gives only a very weak yellow coloration. Hereupon about ⅔ of the acid is distilled off and the residue is treated with water, the acetyl-para-amidophenyl-arsinic acid being then precipitated. It is readily soluble in soda, soluble with difficulty in dilute hydrochloric acid and is saponified by boiling with concentrated hydrochloric acid forming para-aminophenlyarsinic acid.

As stated by Dr. Browning (Chemo-Therapy in Trypanosome Infections: An Experimental Study, *The Journal of Pathology and Bacteriology*, Vol. XII, 1908), the effect of atoxyl on experimental trypanosome infections is not favorable. But when using the sodium-salt of acetyl-para-aminophenylarsinic acid (acet-atoxyl) and injecting 0.033 gr. of it into mice weighing 20 gr. which have been infected with trypanosomes a complete recovery is attained. Of the acetylatoxyl 0.033 gr. may thus be injected into mice infected with trypanosomes, whereas if 0.005 gr. of atoxyl be injected into such an animal, it will have a fatal effect on the same. The sodium-salt of the acetyl-para-aminophenylarsinic acid is also used in the treatment of syphilis in such a manner that repeated injections of 0.6 gr. of it are made, as has been indicated by Professor Neisser in his report submitted to the Congress of Dermatologists, held at Frankfort-on-the-Main on the 9th June, 1908.

Having now described our invention, what we claim is:—

1. As products, the acyl derivatives of para-aminophenylarsinic acid, the composition of which corresponds to the formula: Acyl-$NHC_6H_4AsO(OH)_2$, being white crystalline compounds, soluble with difficulty in water, alcohol and ether, readily soluble in alkali and alkali-carbonates with formation of alkali salts, re-precipitated from these solutions by hydrochloric acid and yielding, when heated with concentrated hydrochloric acid, para-aminophenylarsinic acid.

2. As product, acetyl-para-aminophenylarsinic acid, being a white compound of the composition of $CH_3CONHC_6H_4AsO(OH)_2$, crystallizing from acetic acid in leaflets, soluble with difficulty in water, alcohol and ether, readily soluble in a sodium carbonate solution to a sodium salt from which solution it is precipitated unchanged by means of hydrochloric acid, but yielding, when boiled with concentrated hydrochloric acid, para-aminophenylarsinic acid.

In testimony, that we claim the foregoing as our invention, we have signed our names in presence of two subscribing witnesses.

PAUL EHRLICH.
                  ALFRED BERTHEIM.

Witnesses:
     JEAN GRUND,
     CARL GRUND.